United States Patent [19]

Curtis et al.

[11] Patent Number: 4,614,627
[45] Date of Patent: Sep. 30, 1986

[54] METHOD OF INJECTION MOLDING A THERMOPLASTIC HOLLOW OR HOLLOW FOAM FILLED ONE PIECE HEAD OF A GOLF CLUB

[75] Inventors: Michael E. Curtis, Wakefield; Robert C. Haines, Huddersfield, both of England

[73] Assignee: Dunlop Limited, England

[21] Appl. No.: 530,129

[22] Filed: Sep. 7, 1983

[30] Foreign Application Priority Data

Oct. 5, 1982 [GB] United Kingdom ............... 8228423

[51] Int. Cl.⁴ .................... B29C 33/52; B29C 45/36; B29C 67/22
[52] U.S. Cl. ..................... 264/46.6; 249/62; 264/221; 264/328.1; 264/DIG. 44; 273/167 H; 273/DIG. 8; 425/542; 425/817 R; 425/DIG. 12
[58] Field of Search ............ 264/221, 46.6, 328.1, 264/DIG. 44; 273/167 H, DIG. 8; 249/62; 425/542, DIG. 12, 817 R

[56] References Cited

U.S. PATENT DOCUMENTS

| | | | |
|---|---|---|---|
| 3,229,980 | 1/1966 | Silberman | 273/167 H X |
| 3,556,532 | 1/1971 | Ballmer | 273/167 H |
| 4,214,754 | 7/1980 | Zebelean | 273/167 H |
| 4,313,607 | 2/1982 | Thompson | 273/167 H |
| 4,319,752 | 3/1982 | Thompson | 273/167 H X |
| 4,343,757 | 8/1982 | Popplewell | 264/221 |
| 4,429,879 | 2/1984 | Schmidt | 273/167 H |
| 4,464,324 | 8/1984 | Hager | 264/221 |

FOREIGN PATENT DOCUMENTS

1476889  6/1977  United Kingdom .

*Primary Examiner*—Philip Anderson
*Attorney, Agent, or Firm*—Stevens, Davis, Miller & Mosher

[57] ABSTRACT

A one-piece, hollow, moulded head for a golf-club of the "wood" or "driver" type is made by injecting a thermoplastics material around a fusible core having a melting-point below the injection temperature, allowing the injected material to set and melting out the core.

One or more holes are provided, the holes extending completely through the core, so that the injected material fills each hole and sets therein to provide corresponding internal "struts" in the moulding.

The injected material may be, e.g., a polyamide, a polycarbonate, a poly(phenylene oxide), an acetal resin or an ABS resin. The material may be reinforced with up to 50% by weight of glass and/or carbon fibres.

The moulded head may optionally be filled with a polyurethane foam.

The finished moulding may have the conventional face-pieces and/or sole-plates attached thereto.

10 Claims, 4 Drawing Figures

METHOD OF INJECTION MOLDING A THERMOPLASTIC HOLLOW OR HOLLOW FOAM FILLED ONE PIECE HEAD OF A GOLF CLUB

This invention relates to a method of making heads for golf-clubs and to golf-club heads obtained thereby. In particular, the present invention relates to a method of making a one-piece, hollow, moulded head for a golf-club of the "wood" or "driver" type, the head being made from a plastics material.

The heads of golf "woods" are traditionally made from wood, starting from a solid block from which the head is shaped by a machining process. Alternatively, the block may be made up of a laminate of wood veneers glued together prior to the machining operation. It is customary to provide a plastic face-insert to prevent wear in the position where contact is made with the ball and a metal sole-plate is provided to prevent wear on the underside of the head where contact with the ground can occur. It is also customary to add one or more weights by incorporating them in holes drilled in the underside of the head prior to attachment of the sole plate. The added weights are used to adjust the overall weight of the club head.

It is known to make "wood" heads of hollow metal castings (optionally filled with a cellular material). Such metal heads are described in, inter alia, U.S. Pat. Nos. 4,319,752 and 4,214,754 and in U.K. Pat. No. 1,476,889 and are available on the market. These metal heads involve at least a two-part construction, the parts being subsequently welded together. Advantages which are claimed for such heads include the weight of the head being concentrated in the wall of the head. This disposition of weight is thought to provide certain advantages on ball contact, particularly in relation to uniformity of direction of travel of the ball, even though the contact position on the face will vary slightly from shot to shot. Also, the rigid quality of the metal face imparts high speed to the ball and so good distance is obtained. One disadvantage of the metal wood is the rather peculiar noise made on ball contact and this can prove disconcerting to the golfer who is accustomed to the sound produced by clubs made of wood.

This invention is concerned with making a hollow "wood" from a plastics material which has the advantage of a hollow metal "wood" but not the disadvantages. Although it is known to make "wood" heads from a plastics material, such known heads have been 'solid' and as such have been more directly comparable to the traditional heads made of wood. In other words, they have not had the advantage of concentrating the main weight of the head in a hollow shell.

We have now found that it is possible to make an improved "wood" head from a plastics material, that these heads can be made in an economical and reproducible manner, and that such heads do not incur the disadvantages of the known metal "wood" heads. This is achieved, according to the present invention, by injection-moulding a thermoplastics material around a fusible core member, allowing the injected material to solidify and subsequently melting out the core member. This produces a "wood" head comprising a shell of plastics material which does not need any subsequent welding or other jointing process.

The accompanying drawings illustrate, by way of example only, the molds, mold inserts and manufacture of a golf club head according to the present method in which.

Figure 1:
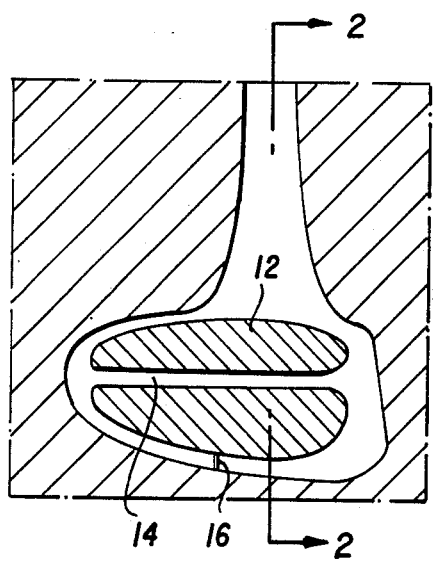
FIG. 1 is a transverse sectional view through a golf club head mold according to the present invention with the fusible core in place and prior to filling with thermoplastics material.
Figure 3:
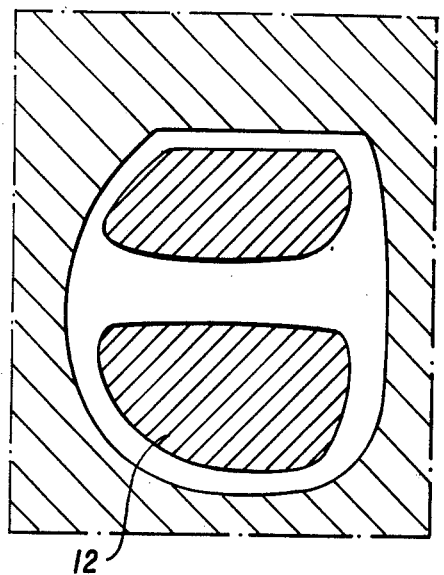
FIG. 3 is a sectional view on line 3—3 of FIG. 2 as viewed from above.
Figure 2:
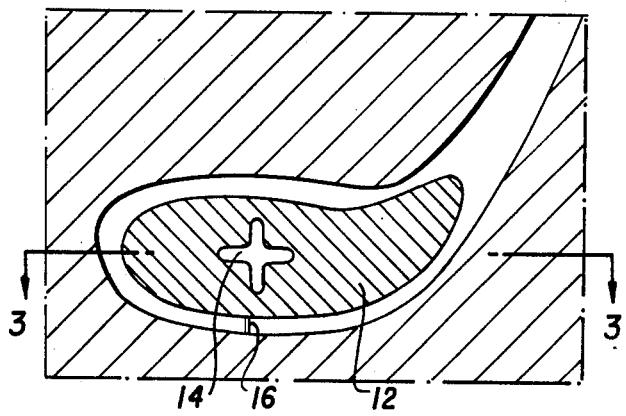
FIG. 2 is a longitudinal sectional view along line 2—2 of FIG. 1.
Figure 4:
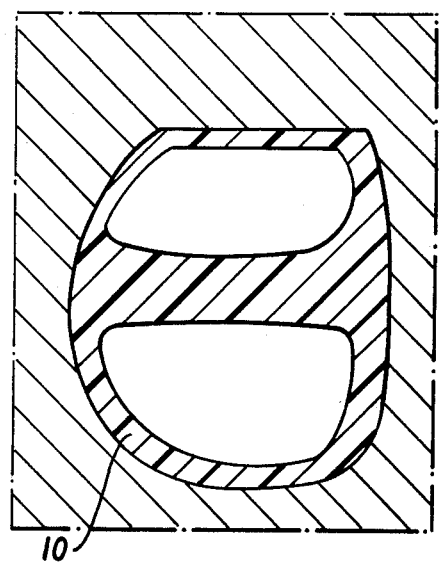
FIG. 4 is a view similar to FIG. 3 but with the thermoplastics material in place and the fusible core material removed.

Accordingly, the present invention provides a method of making a hollow, one-piece head for a golf-club of the "wood" or "driver" type, in which the head is made by injecting a thermoplastics material 10 around a fusible core member 12, said core member 12 being made of a material having a melting point below the injection temperature of the thermoplastics material, allowing the injected material to set to form a moulding and subsequently raising the temperature to a level sufficient to melt the core member 12 but insufficient to melt or deform the moulding, said core member moreover being provided with one or more holes extending completely through the core member, whereby the injected material fills each hole and sets therein to produce corresponding internal "struts" 14 in the moulding.

The present invention also provides a hollow, one-piece head for a golf-club of the "wood" or "driver" type, the head having been made from a thermoplastics material by the method described in the immediately-preceding paragraph.

The thermoplastics material may be any such material which is capable of being injection-moulded, for example a polyamide, a polycarbonate, a poly(phenylene oxide), an acetal resin or an acrylonitrile-butadiene-styrene (ABS) resin.

Preferably, the thermoplastics material is reinforced with fibres of glass, or of carbon, or of a mixture of glass fibres and carbon fibres. The fibres may suitably be present in an amount of 10 to 50% by weight of the thermoplastics material.

The fusible core member is preferably of a metal such as Wood's metal (an alloy of lead, tin, bismuth and cadmium) or one of the commercially-available low melting-point alloys, e.g. those available from Mining and Chemical Products Limited as "MCP". Various types are available, having melting-points ranging from 47° C., (MCP47) to 199° C. (MCP200).

The fusible core member may be made by any convenient means, but diecasting is preferred. The core member is provided with one or more holes passing completely through it so that, when the thermoplastics material is injected around the core member, the injected material fills the holes and sets therein to provide, when the core member is melted out, a corresponding internal "strut" in the hollow moulded head. The cross-sectional configuration of the holes will determine that of the resulting "struts" and may, for example, be rectangular, circular or cruciform.

It is necessary, when moulding a hollow one-piece head by the method of the present invention, to provide means for the release of the fusion-products of the core member. This is suitably achieved by inserting a locating means, such as a screw or pin 16, in the base of the fusible core member before beginning the injection-moulding process. (The screw or pin should be left "proud" of the core member so that the plastics material can be injected over the whole of the core surface). This results in the creation of a hole in the plastics material at the end of the injection-moulding process. Furthermore, the screw or pin also serves to locate the core within the moulding. On removal of the screw or pin, the fusible core member is heated to its melting point and the molten core material flows out through the hole.

The hole may then be used as an entry port for a foam-forming reaction mixture in order to fill the hollow moulded head with foam. Suitable foams for this purpose include rigid polyurethane foams. The hole is then closed and it may be found convenient to achieve closure by allowing the foam-forming reaction mixture to fill the hole and set therein.

In order to attain the correct weight of the head, metal weights may be inserted after removal of the fusible core member. Alternatively, the core member may be so shaped that injection of the plastics material causes the formation of one or more "pockets" inside the head which retains some of the metal from the core. In either case, the metal weights are sealed in position by the foam filling.

It will be appreciated that variation in the wall-thickness of the finished head can readily be achieved by corresponding variations in the shape and configuration of the fusible core member.

The core member can also be shaped so that the finished moulding incorporates face-lines, Trade Marks or other motifs, or recesses for the subsequent attachment of face-pieces and/or sole-plates. Alternatively, the face-pieces and/or sole-plates may be placed in position on the core member prior to injection of the plastics material, so that they become moulded in situ into the final moulded product.

The finished moulding may, if required, be sanded and/or painted to provide any desired aesthetic appearance.

We have found that a golf club having a head according to the present invention allows the golfer to strike the ball in an accurate and consistent manner and to obtain good distance of shot.

We claim:

1. A method of making a hollow, one piece head for a golf club of thermoplastics material comprising:
    (a) forming a fusible core member of a material having a melting point below the injection temperature of said thermoplastics material and with at least one hole extending through the core member;
    (b) placing the core member in a mold of the desired size and shape of the finished article, said mold completely surrounding the core member and supporting the core member within the mold;
    (c) injecting said thermoplastics material into said mold to fill both the space around said core member and said hole therethrough;
    (d) allowing said thermoplastic material to set so as to form a molding surrounding the core member and at least one internal strut within the molding and corresponding to said hole;
    (e) raising the temperature of the mold and core member to a level sufficient to melt the core member but insufficient to melt or deform said thermoplastics material;
    (f) removing the melted core material to leave a hollow golf club head with at least one internal strut completely enclosed within the hollow space at a position corresponding to the location of said hole with the molding of the club head completely surrounding strut.

2. The method of claim 1, wherein said thermoplastics material is one selected from the group consisting of polyamides, polycarbonates, poly(phenylene oxides), acetal resins and acrylonitrile-butadiene-styrene (ABS) resins.

3. The method of claim 1, wherein said thermoplastics material is reinforced with fibres selected from the group consisting of glass fibres, carbon fibres and mixtures of said glass fibres with said carbon fibres.

4. The method of claim 3, wherein said fibres are present in an amount of from 10% to 50% by weight of said thermoplastics material.

5. The method of claim 1, wherein said fusible core member is made of a material selected from the group consisting of metals and metal alloys.

6. The method of claim 1, wherein said moulding is filled with a foam-forming reaction mixture after removal of said fusible core member therefrom.

7. The method of claim 6, wherein said foam-forming reaction mixture is constituted so as to produce a rigid polyurethane foam inside said moulding.

8. The method of claim 1, wherein at least one weight is enclosed within said moulding.

9. The method of claim 1, wherein a face-piece is incorporated into said moulding.

10. The method of claim 1, wherein a sole plate is incorporated into said moulding.

* * * * *